May 2, 1933.  G. W. CURTIS  1,906,545
BEARING CLOSURE
Filed Jan. 20, 1932

INVENTOR:
George W. Curtis,
by Carr Tkan Gravely,
HIS ATTORNEYS.

Patented May 2, 1933

1,906,545

UNITED STATES PATENT OFFICE

GEORGE W. CURTIS, OF MILWAUKEE, WISCONSIN, ASSIGNOR TO THE TIMKEN ROLLER BEARING COMPANY, OF CANTON, OHIO, A CORPORATION OF OHIO

BEARING CLOSURE

Application filed January 20, 1932. Serial No. 587,629.

My invention relates to bearing closures, particularly to bearing closures subjected to excessive amounts of foreign matter, such as, for example, bearing closures for tractor wheels, and other devices that operate in mud, water, or dust; and the principal object of this invention is to devise a simple and compact bearing closure that is capable of preventing any undesirable foreign matter from passing therethrough, even though comparatively large quantities of such matter be thrown against the outer end of the closure.

My invention consists principally in placing spring closure rings against packing rings provided at the end of a bearing in such manner that the pressure exerted by the spring rings tends to force the packing rings towards the outer periphery of the bearing and also towards the outer end thereof. It also consists in the bearing closure, and in the parts, combinations and arrangements of parts hereinafter described and claimed.

Figure 1:
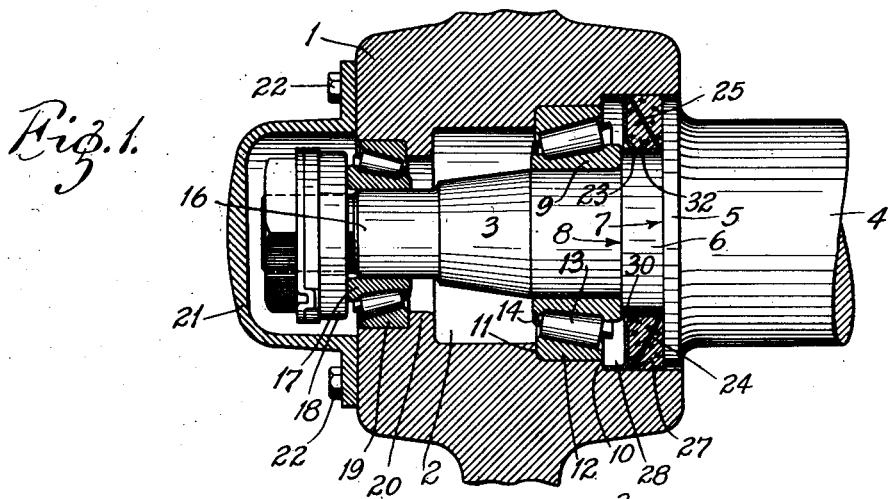
Figures 2, 3:
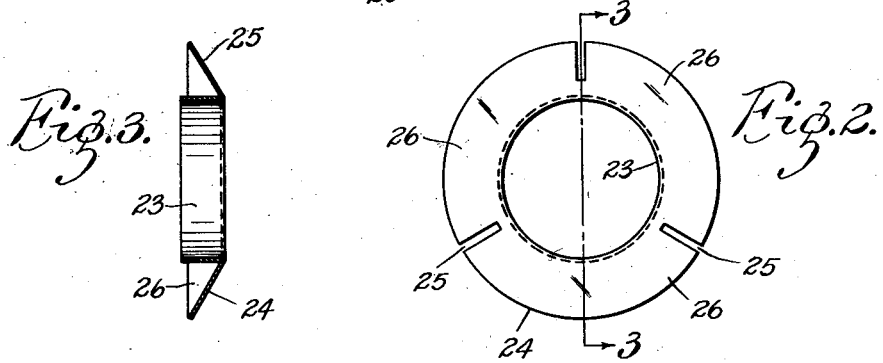
Figures 4, 5:
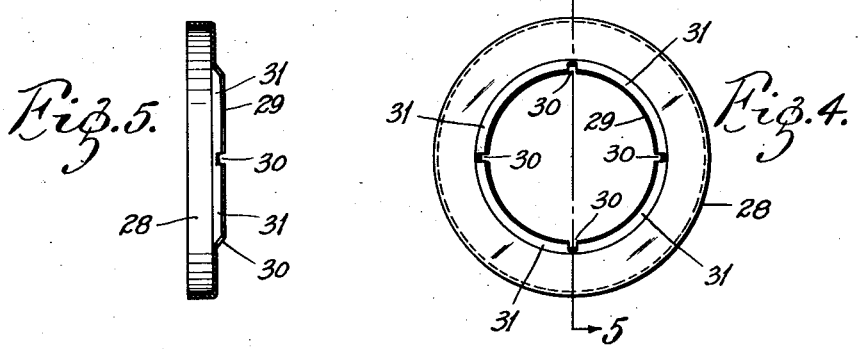

In the accompanying drawing, which forms a part of this specification and wherein like reference numerals refer to like parts wherever they occur, Fig. 1 is a vertical longitudinal section view taken through the middle of a wheel hub and axle bearing construction provided with a bearing closure embodying my invention, Fig. 2 is an end view of the outermost spring closure ring constituting a part of my invention, Fig. 3 is a sectional view taken along the line 3—3 in Fig. 2, Fig. 4 is an end view of the innermost spring closure ring constituting a part of my invention, and Fig. 5 is a sectional view along the line 5—5 in Fig. 4.

In the construction illustrated, I have preferred to show my invention used in connection with a tractor wheel having a hub 1 constituting a bearing housing. Said hub is provided with a journal opening 2 for receiving a spindle portion 3 of an axle 4. The diameter of the axle 4 is slightly increased as it enters the journal opening to form an annular rib 5 before it is reduced to form a base spindle portion 6 defined by an annular shoulder 7 constituting the inner end face of the rib 5. The diameter of the spindle portion 6 is further reduced near the center of the journal opening to form an annular shoulder 8; and mounted upon this further reduced spindle portion is a roller bearing cone 9 having its larger end abutting against the annular shoulder 8. The diameter of the journal opening is slightly reduced near the axle end to form an annular shoulder 10 therein and it is further reduced nearer to the center of the journal to form a second annular shoulder 11; and mounted in the journal opening is a roller bearing cup 12 for cooperating with said cone 9, said cup having its larger end abutting against the second annular shoulder 11; and interposed between the cone and cup is a series of conical rollers 13 mounted in a suitable cage 14.

The spindle portion of the axle tapers from the smaller end of the cone 9 to form a further reduced spindle portion 16 near the end of the spindle; and mounted on this part 16 of the spindle is a second roller bearing cone 17 having its larger end abutting against suitable holding and adjusting means 18 provided on the end of the spindle. Cooperating with the second cone 17 is a cup 19 having its larger end abutting against the end of an inwardly extending annular rib 20 provided in the journal opening; and the spindle end and journal opening opposite the axle end are completely enclosed by a suitable hub cap 21 secured to the wheel hub by means of screws 22.

My bearing closure comprises a cylindrical ring 23 of steel or the like which is press fitted on the base spindle portion 6 and which has its inner end abutting against the larger end of the cone 9. The outer end of said ring has an outwardly extending conically disposed annular flange 24 surrounding the cylindrical body portion of the ring and almost touching the wall of the journal opening; and this flange 24 is provided with a series of radial slots 25 in its outer periphery forming a leaf spring 26 between each adjacent pair of radial slots. A packing ring 27, of cork or like material, is inserted in the space between the conical flange 24 and the inner face 7 of the annular rib 5 surrounding the axle, the outer periphery of said packing ring 27 engaging the wall of the journal opening and the inner end of said packing ring being conical for engaging the full outer conical face of the conical flange 24.

Press fitted in the journal opening is a second cylindrical spring ring 28 having its inner end abutting against the first annular shoulder 10 provided near the end of the journal opening. This ring is provided on its outer end with an inwardly extending annular flange 29 surrounding the inner end of the first mentioned cylindrical ring 23 and the inner peripheral end portion of the flange 29 is bent outwardly at an angle until it almost touches the outer periphery of the first mentioned spring ring 23; and this latter bent flange portion is provided with radial slots 30 to form a comparatively short leaf spring 31 between each adjacent pair of radial slots. Mounted around the cylindrical ring portion of the first mentioned spring ring 23 is a second packing ring 32, of cork or the like, and of such shape as to fill the entire space between the respective flange portions of the two spring rings.

My invention affords a number of advantages over the usual type of bearing closures. My construction provides for an automatic take up for closure wear in the smallest possible space and the spring pressure exerted upon each packing ring is both towards the outer periphery of the bearing and also towards the outer end thereof which is exposed to foreign matter. Furthermore, since my spring rings are very flexible they completely eliminate any possibility of interfering with the bearing adjustment which is a difficult problem to overcome in designing bearing closures adapted for heavy duty. A further advantage is that my closure construction includes no catch basins or the like for collecting dirt within the bearing itself, which is, obviously, undesirable.

Furthermore, the foregoing advantages of my invention are obtained without complicating the bearing assembly which is as follows: the innermost spring ring 28 is press fitted in the journal opening after the cup, cones and rollers are assembled therein; and the outermost packing ring 27 is assembled on the spindle and held in place by fitting the outermost spring ring 23 on the spindle and then the inner packing ring 32 is fitted around the ring 23 on the spindle. With the journal opening and spindle parts assembled as described, the wheel hub is then easily slipped over the spindle by having a slightly loose bearing fit which is readily adjusted after the entire assembly is completely set up.

Obviously, as my closure construction may be used with almost any type of bearing and as the construction hereinabove described admits of considerable variation without departing from the spirit of my invention, I do not wish to be limited to the precise construction shown and described.

What I claim is:

1. An end closure for a member extending into a housing comprising a ring on said member within said housing and having outwardly extending radial leaf springs on its outer end which are disposed obliquely toward the inner end of said ring, a packing ring having a conically disposed inner end mating with and engaging said leaf springs and means on said member for engaging the outer end of said packing ring for preventing endwise movement thereof outwardly of said housing.

2. An end closure for a member extending in a housing, one being rotatable with respect to the other, and having bearings therebetween, comprising a spring ring mounted on said member at the end of said bearings and having a conically disposed annular flange on its outer end, said flange having slots in its outer periphery forming a leaf spring between each adjacent pair of slots, a packing ring having its outer periphery engaging said housing and having a conical inner end engaging said conically disposed annular flange; means for preventing endwise movement of said packing ring outwardly of said housing, means for preventing endwise movement of said spring ring inwardly, a second packing ring mounted around said spring ring on the inside of the conical flange thereon and having a conical outer end engaging the inside face of said flange, and means for forcing said second packing ring against said flange.

3. A bearing closure for a member extending into a housing, one being rotatable with respect to the other, comprising a spring ring mounted on said member and having a conically disposed flange on its outer end, a packing ring mounted around said spring ring and having an outer conical end adapted to fit against the inner face of said flange, and a second spring ring mounted in said housing and having an inwardly extending annular flange provided with an outwardly protruding conical flange on its inner periphery adapted to press against the inner end of said packing ring, the inner end of said packing ring being of such shape as to correspond to that of the adjacent flange portion pressing against it.

4. A bearing closure for a member extending into a housing, one being rotatable with respect to the other, comprising a spring ring mounted on said member and having a conically disposed annular flange on its outer end, a packing ring having a conical inner end engaging the outer face of said flange, means for preventing endwise movement of said packing ring outwardly, a second spring ring mounted in said housing and having an inwardly extending annular flange provided with forwardly extending radial leaf springs on its inner periphery and a second packing ring in the space between the rings.

5. A bearing closure for a member extending into a bearing housing, one being rotatable with respect to the other, comprising a spring ring mounted on said member and having a conically disposed outwardly extending annular flange on its outer end, said flange having radial slots in its periphery, a packing ring having a conical inner end engaging said annular flange, means engaging the outer end of the said packing ring for preventing endwise movement thereof outwardly, a second spring ring mounted in said housing and having an inwardly extending annular flange which is bent forwardly near its inner peripheral edge to form a conical surface, said latter conical portion having radial slots therein and a second packing ring having its ends engaging the flanges of the two spring rings.

6. A bearing closure for a member having a reduced portion thereof extending into a bearing housing, comprising a cylindrical ring mounted on the reduced portion of said member and having a conically disposed annular flange on its outer end extending rearwardly therefrom, said flange having radial slots in its periphery to form a leaf spring between each adjacent pair of radial slots, a packing ring having its outer periphery engaging said housing and mounted in the space between the annular shoulder formed by reducing said member and the outer face of said annular spring flange, a second cylindrical ring mounted in the housing and having an inwardly extending annular flange surrounding the inner end portion of the said first mentioned cylindrical ring, said inwardly extending annular flange being bent forwardly at an obtuse angle near its inner peripheral edge, said latter bent flange portion having radial slots in its periphery to form a leaf spring between each adjacent pair of radial slots and a second packing ring surrounding the first mentioned cylindrical ring and having its ends engaged by the respective flange portions of the two cylindrical rings.

7. A bearing closure for an axle extending into a housing, said axle being reduced to form an annular shoulder near the end of said housing and a cone mounted on the reduced portion of said axle, said bearing closure comprising a ring mounted on the axle and having one end abutting against the end of said cone and having a conically disposed annular flange on its other end, said conically disposed annular flange having radial slots in its periphery, a packing ring having a conical end engaging said annular flange and having its other end engaging the annular shoulder on the axle, a second ring mounted in the housing and having one end abutting against a shoulder therein and having an inwardly extending annular flange on its other end, said annular flange having a conically disposed peripheral end portion surrounding the first mentioned ring, said peripheral end portion having radial slots therein, and a second packing ring mounted in the space between the flange portions of the two rings.

8. A bearing closure for an axle extending into a journal opening in a wheel hub, said axle having an outwardly extending annular rib adjacent to the end of said hub and a cone mounted on said axle, said closure comprising a ring mounted on said axle and having one end abutting against the end of said cone and having a conically disposed annular flange on its other end, a packing ring in the space between the outwardly extending rib on the axle and said conically disposed annular flange and having its outer periphery engaging the wall of the journal opening, a second ring mounted in the journal opening and having one end abutting against a shoulder formed therein and having an inwardly extending annular flange on its other end, said flange having a conically disposed end peripheral portion having radial slots therein, a second ring mounted around said first mentioned ring and filling the space between the flange portions of the two rings.

9. A bearing closure for a member extending into a housing, one being rotatable with respect to the other, comprising a spring ring mounted on said member and having a conically disposed annular flange on its outer end, a packing ring having a conical inner end engaging the outer face of said flange, means for preventing endwise movement of said packing ring outwardly, a second spring ring mounted in said housing and having an inwardly extending annular flange, and a second packing ring in the space between the flanges of the spring rings.

Signed at Milwaukee, Wisconsin, this 11th day of January, 1932.

GEORGE W. CURTIS.